US011082203B2

(12) United States Patent
Hari et al.

(10) Patent No.: US 11,082,203 B2
(45) Date of Patent: Aug. 3, 2021

(54) METHOD AND APPARATUS FOR ACCELERATING THE BLOCKCHAIN FOR SECURE AND HIGH THROUGHPUT APPLICATIONS

(71) Applicant: NOKIA SOLUTIONS AND NETWORKS OY, Espoo (FI)

(72) Inventors: Adiseshu Hari, Murray Hill, NJ (US); Muralidharan Kodialam, Holmdel, NJ (US); Tirunellai V. Lakshman, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 486 days.

(21) Appl. No.: 15/855,723

(22) Filed: Dec. 27, 2017

(65) Prior Publication Data
US 2019/0199514 A1    Jun. 27, 2019

(51) Int. Cl.
*H04L 9/06* (2006.01)
*H04L 29/08* (2006.01)
*H04L 9/32* (2006.01)

(52) U.S. Cl.
CPC .......... *H04L 9/0637* (2013.01); *H04L 9/0643* (2013.01); *H04L 9/3239* (2013.01); *H04L 9/3297* (2013.01); *H04L 67/104* (2013.01); *G06Q 2220/00* (2013.01); *H04L 2209/38* (2013.01); *H04L 2209/56* (2013.01)

(58) Field of Classification Search
CPC ............ G06Q 2220/00; H04L 2209/56; H04L 9/3297; H04L 67/104; H04L 9/3239; H04L 9/0637; H04L 9/0643; H04L 2209/38

USPC ........................................................ 715/609
See application file for complete search history.

(56) References Cited

U.S. PATENT DOCUMENTS

| | | | |
|---|---|---|---|
| 9,774,578 B1 * | 9/2017 | Ateniese | H04L 9/3242 |
| 2017/0017955 A1 * | 1/2017 | Stern | H04W 4/02 |
| 2017/0034197 A1 * | 2/2017 | Daniel | H04L 9/3236 |
| 2017/0075941 A1 * | 3/2017 | Finlow-Bates | H04L 9/3239 |
| 2017/0213221 A1 * | 7/2017 | Kurian | G06Q 20/38215 |
| 2017/0243177 A1 * | 8/2017 | Johnsrud | G06Q 20/10 |
| 2018/0331832 A1 * | 11/2018 | Pulsifer | H04L 9/0637 |
| 2019/0166085 A1 * | 5/2019 | Li | H04L 61/1511 |

OTHER PUBLICATIONS

Kuo et al.: Blockchain distributed ledger technologies for biomedical and health care applications, Journal of the American Medical Informatics Association, Advance Access Publication Date: Sep. 8, 2017 (Year: 2017).*
"Notification of Transmittal of the International Search Report and the Written Opinion", of the International Searching Authority or the Declaration dated Apr. 3, 2019 for Intl. Appl. No. PCT/US18/67704.

* cited by examiner

*Primary Examiner* — Kuen S Lu
(74) *Attorney, Agent, or Firm* — Kramer Amado PC

(57) ABSTRACT

Various embodiments relate to a method for accelerating blockchains, the method comprising the steps of waiting for an event to occur, receiving a block, determining whether the block is valid, adding the block to a block tree, determining whether the block is a singular candidate, starting a timer for the block, determining whether the timer has expired for the block, determining whether the block is still singular after the time has expired for the block and processing the singular block.

25 Claims, 9 Drawing Sheets

METHOD AND APPARATUS FOR ACCELERATING THE BLOCKCHAIN FOR SECURE AND HIGH THROUGHPUT APPLICATIONS

TECHNICAL FIELD

This disclosure relates generally to a distributed data structure, namely, a blockchain, and more specifically, but not exclusively, to accelerating the blockchain throughput.

BACKGROUND

Blockchain is a distributed data structure which gave rise to the cryptocurrency commonly referred to as Bitcoin. The blockchain achieves consensus about transactions in an asynchronous, open, peer-to-peer ("p2p") network.

Blockchain enabled the cryptocurrency Bitcoin to solve a problem that was not solved by any prior cryptocurrencies or distributed transaction systems, which is enabling trusted transactions across untrusted peers without any centralized trusted entity.

A blockchain is a distributed ledger maintained by the users of a system to validate and record a continuously generated set of transactions. Transactions are generated in the system, for example, by users or by other entities and are visible to all users. These transactions are grouped into blocks.

Each block comprises of a set of valid transactions and a link to a previous block.

Since these blocks are chained together by the link to the previously generated block, it is difficult to modify a block once it is recorded. This is because of the fact that any change in data in one block will result in a cascade of changes in all subsequent blocks. Unless a user has more computational power than the rest of the network (or there is collusion between a majority of the users), it is not possible to make changes in the portion of the blockchain that is far from the tip of the blockchain. Therefore, blockchains can be used as a permanent, verifiable ledger for recording transactions.

Before the distributed data structure of blockchain was used, it was assumed that no asynchronous, consensus protocol could operate in the presence of faults.

It was also assumed that a distributed system could choose only two out of three properties, namely: consistency, availability and partition tolerance. The blockchain upended both assumptions by working with a probabilistic notion of consistency that was much weaker than consistency models previously used.

SUMMARY OF EXEMPLARY EMBODIMENTS

A brief summary of various embodiments is presented below. Embodiments address the need to create for accelerating the blockchain.

In order to overcome these and other shortcomings of the prior art and in light of the present need to create a method for accelerating the blockchain for secure and high throughput applications, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments described herein relate to a method for accelerating blockchains, the method including the steps of waiting for an event to occur, receiving a block, determining whether the block is valid, adding the block to a block tree, determining whether the block is a singular candidate, starting a timer for the block, determining whether the timer has expired for the block, determining whether the block is still singular after the time has expired for the block and processing the singular block.

In an embodiment of the present disclosure, the method for accelerating blockchains, includes returning to waiting for an event to occur when the block is invalid.

In an embodiment of the present disclosure, the method for accelerating blockchains, includes stopping the timer when the block is not a singular candidate and returning to waiting for an event to occur.

In an embodiment of the present disclosure, the method for accelerating blockchains, includes returning to waiting for an event to occur after the timer has expired when the block is not singular.

In an embodiment of the present disclosure, the method for accelerating blockchains, includes returning to waiting for an event to occur after processing the singular block.

In an embodiment of the present disclosure, the method for accelerating blockchains, includes determining whether the block is a new blockchain tip.

In an embodiment of the present disclosure, the method for accelerating blockchains, includes generating a new blockchain tip event when the block is the new blockchain tip.

In an embodiment of the present disclosure, the method for accelerating blockchains, includes determining whether the new block is a singular candidate when the block is not a new blockchain tip.

In an embodiment of the present disclosure, the method for accelerating blockchains, includes incrementing a singular block count after processing the singular block.

In an embodiment of the present disclosure, the method for accelerating blockchains, includes determining whether the singular block count is C after incrementing the singular block count.

In an embodiment of the present disclosure, the method for accelerating blockchains, includes returning to waiting for an event to occur when the singular block count is not C.

In an embodiment of the present disclosure, the method for accelerating blockchains, includes resetting the singular block count when the singular block count is C.

In an embodiment of the present disclosure, the method for accelerating blockchains, includes computing a new difficulty after resetting the singular block count.

In an embodiment of the present disclosure, the method for accelerating blockchains, includes generating a new difficulty event after computing the new difficulty.

In an embodiment of the present disclosure, the method for accelerating blockchains, includes returning to wait for an event to occur after generating the new difficulty event.

In an embodiment of the present disclosure, the method for accelerating blockchains, includes marking a first time of the new difficulty event.

In an embodiment of the present disclosure, the method for accelerating blockchains, includes changing to the new difficulty after marking the first time of the new difficulty event.

In an embodiment of the present disclosure, the method for accelerating blockchains, includes resuming mining at the new blockchain tip after changing to the new difficulty.

In an embodiment of the present disclosure, the method for accelerating blockchains, includes canceling current mining after the new blockchain tip event is generated.

In an embodiment of the present disclosure, the method for accelerating blockchains, further includes resuming mining at the new blockchain tip after canceling current mining.

In an embodiment of the present disclosure, the method for accelerating blockchains, includes determining whether a hash of a new block is valid after resuming mining at the new blockchain tip.

In an embodiment of the present disclosure, the method for accelerating blockchains, includes resuming mining when the hash of the new block is invalid.

In an embodiment of the present disclosure, the method for accelerating blockchains, includes determining whether the new block is sent out more than a second time later than the first time of the new difficulty event.

In an embodiment of the present disclosure, the method for accelerating blockchains, includes generating a new block event when the new block is sent out more than a second time later than the first time of the new difficulty event.

In an embodiment of the present disclosure, the method for accelerating blockchains, the method further includes waiting for the second time to expire when the block is sent out less than a second time later than the first time of the new difficulty event.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

Figure 1:
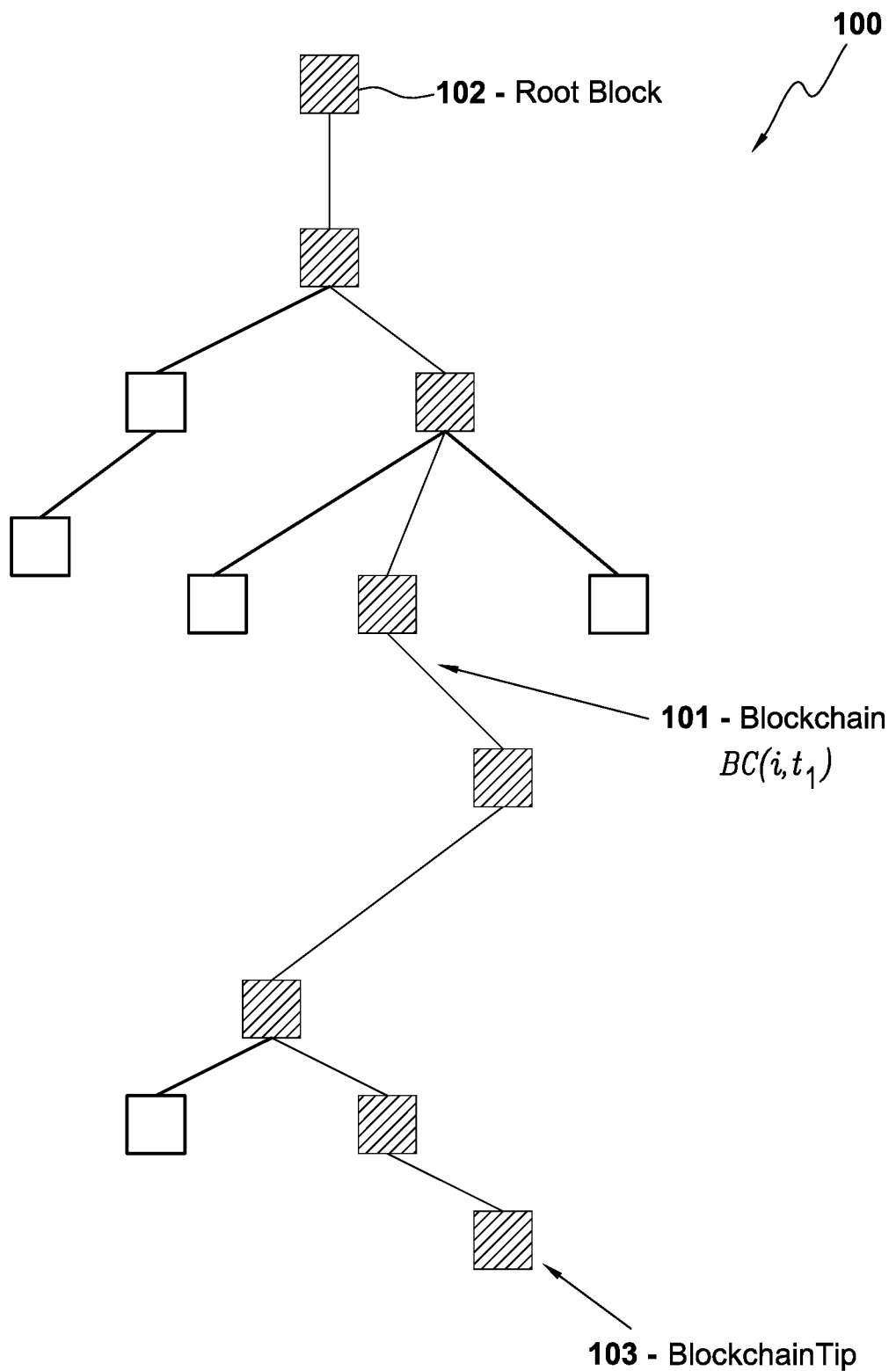
FIG. 1 illustrates an example of a block tree and the corresponding blockchain user i at time $t_1$.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

As described above, the cryptocurrency Bitcoin and the underlying blockchain technology has sparked interest in using the blockchain for other applications beyond cryptocurrencies that require a distributed and secure transactions ledger.

However, there are many shortcomings in the operation of blockchain technology which will be addressed by the following embodiments described below.

The blockchain technology has a low write bandwidth where the low write bandwidth is limited by the rate at which blocks are mined and the block size.

The Proof of Work ("PoW") algorithm that is utilized by Bitcoin's blockchain to validate blocks is both compute and energy intensive.

The blockchain technology works with a probabilistic consistency model, or stated another way, there is always a small probability that a transaction that was previously thought of as confirmed may become unconfirmed.

While the probabilistic consistency model has sufficed for Bitcoin, it is not acceptable for applications with more rigorous demands where transaction rollbacks are not permissible. The embodiments below address these shortcomings of the present blockchain technology.

The current embodiments describe a blockchain algorithm that is explicitly targeted towards a permissioned blockchain.

Unlike the existing blockchain technology, used by Bitcoin, the current embodiments describe blockchain technology which is restricted to vetted participants who are selected through an out-of-band selection process, known as a permissioned blockchain.

The permissioned blockchain model is applicable to numerous applications across a wide range of industries and verticals where a closed group of organizations and participants would like to conduct secure transactions across their peers without relying on a centralized entity to validate the transactions.

For example, a set of banks implementing a common Electronic Fund Transfer ("EFT") scheme, or a group of Internet Service Providers ("ISPs") exchanging Border Gateway Protocol ("BGP") transactions at a common Peering Point, or a secure Internet of Things ("IoT") messaging between autonomous vehicles on an electronic highway.

In addition to being permissioned, the blockchain technology in the current embodiments must be engineered, or stated another way, the blockchain must include an underlying physical network that provides guarantees towards the end-to-end latency in the network.

The model in the current embodiment of an engineered and permissioned blockchain is particularly suited for both ISP and cloud-based Blockchain-As-A-Service ("BaaS") services.

Because the current embodiment describes a closed, and thereby limited, set of participants, the engineered and permissioned blockchain provides a remedy to the deficiencies of current blockchain technology.

The closed blockchain ensures that there is no longer the issue of limiting the block spacing or the block size, since the engineered underlying network can be designed with the requisite bandwidth and latency.

However, block spacing cannot be decreased arbitrarily, as decreasing the block spacing will increase the probability of forking (i.e., creating duplicate blocks) and therefore decrease the blockchain throughput.

The current embodiment describes using a stochastic model of the block generation process to determine the optimal block throughput for a given end-to-end block latency, in a private block chain.

The current embodiment further describes that in a cloud based BaaS offering, ensuring that all the participants in the network work with similar or identical cloud nodes. By using identical nodes and cooperative peers, the PoW race in the current Bitcoin blockchain is unnecessary and furthermore, there is no longer a need for any Application-Specific Integrated Circuit ("ASIC") based hashing or intensive computing power.

The current embodiment further describes a blockchain algorithm that replaces the probabilistic block confirmation algorithm, that is being used by Bitcoin with a deterministic confirmation model.

The deterministic confirmation model leverages the engineered blockchain's end-to-end latency limit to provide a distributed and consistent model across all participants of the confirmed blocks in the blockchain.

FIG. 1 illustrates a block tree 100 and the corresponding blockchain at user i 101 at time $t_1$.

The blockchain 101 begins with a root block 102 that is distributed to all users in the system.

All subsequent blocks in the blockchain 100 are generated using a previously generated block as a predecessor block. Since each block has a unique predecessor block, the set of blocks form a block tree 100.

Each user of the network maintains all the blocks that it has received in the form of a block tree 100 starting from the root block 102.

The set of branches (i.e., children) from the root block 102 is the set of blocks that have declared the root block 102 as a predecessor.

The tree of blocks that each user of the network maintains as the block tree 100. The longest path in the block tree is the blockchain 101.

The block tree 100 at user i is denoted as BT(i, t) and the block tree 100 at user i at time t is denoted as BC(i, t).

During the operation of the system, each user attempts to add blocks to the tip of the blockchain 103.

Transactions that are in blocks that are sufficiently deep (for example, six or more blocks deep) in the blockchain 101 are assumed to be confirmed transactions. However, there is no guarantee that the blockchain 101 may not be replaced by a different blockchain.

Figure 2:
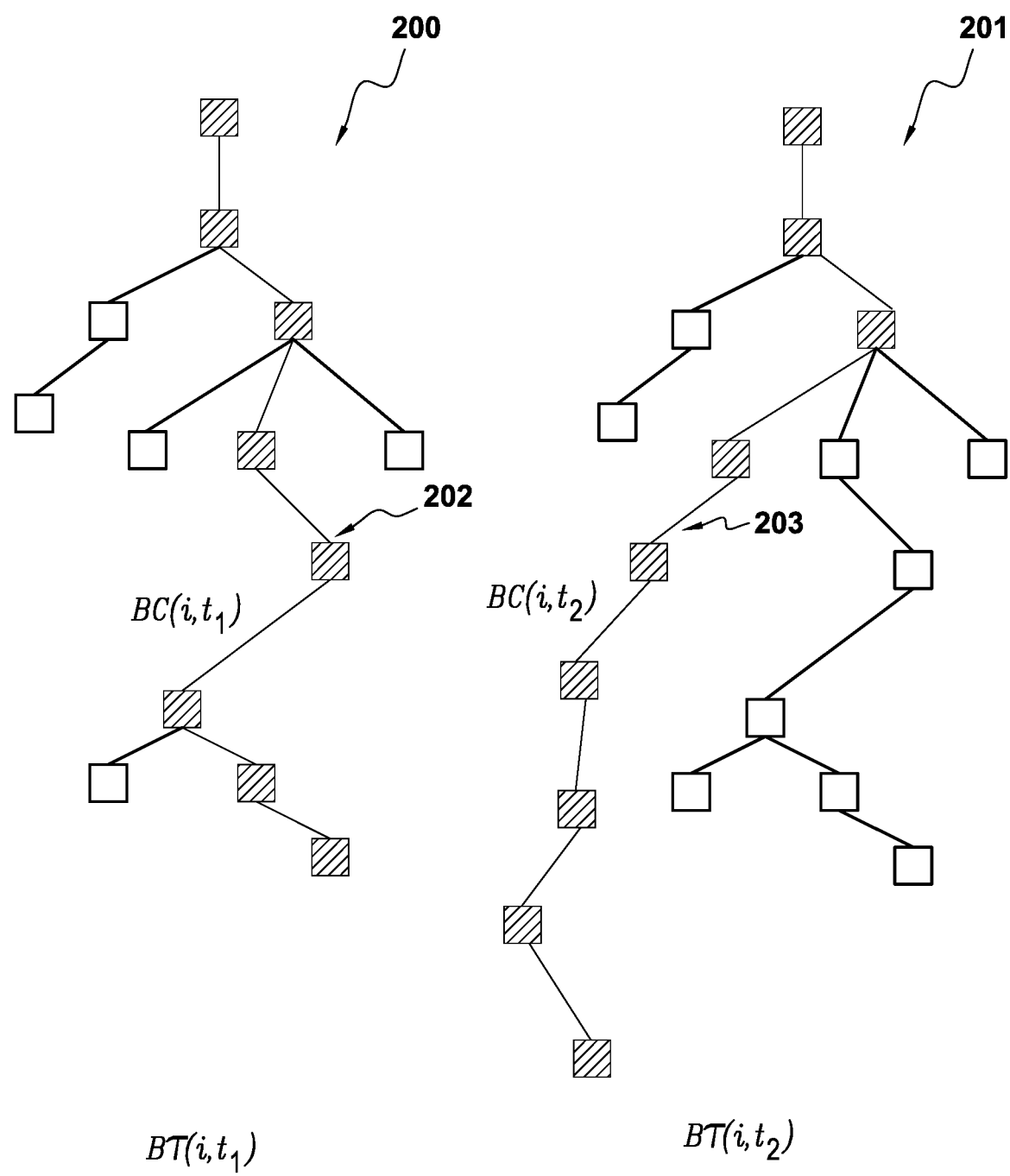
FIG. 2 illustrates an example of changes in the blockchain between times $t_1$ and $t_2$ at user i.

FIG. 2 illustrates changes in the blockchain between times $t_1$ and $t_2$ at user i.

For example, FIG. 2 illustrates block tree 200 and block tree 201.

Block tree 200 includes the corresponding block chain 202 at user i at times $t_1$.

Block tree 201 includes the corresponding block chain 203 at user i at time $t_2$.

In FIG. 2, the last five blocks in the blockchain at time $t_1$ have been replaced by different blocks at time $t_2$. While changes near the tip of the block chain can occur easily, changes deep in the block tree are less likely.

Transactions are confirmed when they are sufficiently away from the tip of the blockchain.

As a result, in order to ensure that there are no significant changes in the blockchain deep in the blockchain (i.e., far away from the tip of the blockchain), the process of adding new blocks to the blockchain is made computationally difficult.

Therefore, it becomes unlikely that there will be changes deep in the blockchain.

This is unlikely because if the block tree at most of the users is similar, then most users will use their computing power to add blocks to the tip of the blockchain, and if others users want to add blocks to a part of the blockchain other than the tip of the blockchain, then the user has to add new blocks at a rate faster than the rest of the users are adding blocks to the tip of the blockchain, which is computationally difficult.

The rate of block addition is controlled by changing the difficulty of adding a block to the blockchain.

The process of adding a block to the blockchain is known as mining.

Once the user of the system collects and verifies a subset of outstanding transactions, it includes the address of the block in the tip of the blockchain and a randomly generated nonce string and computes the hash of this combined string using a cryptographic hash function to a 256 bit hash value.

The hash is considered successful if the resulting hash value is less than some pre-defined target.

If the hash is not successful, then the hash function is performed again with another nonce string.

This process of adding a nonce string and computing a hash is repeated until the hash is successful.

In the case the hash is successful, the new block is added to the tip of the block tree at the current user and is transmitted to all other users in the system.

In the case the hash is unsuccessful, the new block that is received renders the current blockchain tip invalid. In this case, the user immediately stops its computation from the current blockchain tip. The system eliminates all transactions that are in the newly received block and attempts to add a new block to the block at the tip of the new block tree.

Therefore, by controlling the target value, the rate at which blocks are added to the blockchain can be controlled.

If the block addition rate is high, then it will result in significant branching of the block tree and it becomes difficult to determine a stable blockchain.

Figure 3:
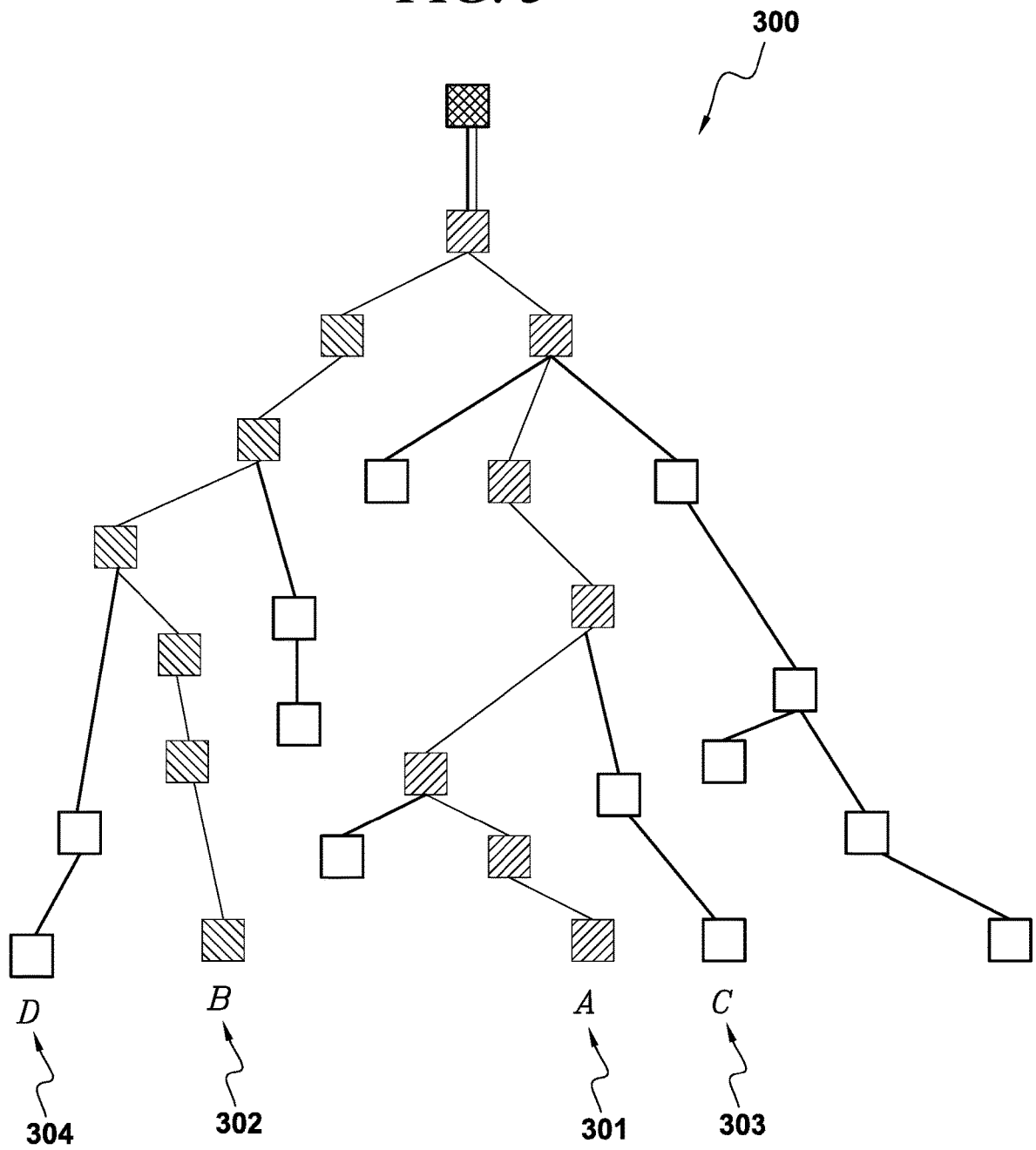
FIG. 3 illustrates an example of high block generation rate results in a branched block tree.

FIG. 3 illustrates that high block generation rate results in a branched block tree 300.

By not controlling the rate at which blocks are added to the block tree, several competing paths that all have the same depth are formed as illustrated in FIG. 3.

In FIG. 3, the tip of the current blockchain is node A 301. However, due to the high rate of addition of blocks, there is another blockchain with tip B 302 which is the same depth as node A 301.

FIG. 3 further illustrates two other tips, node C 303 and node D 304, both of which have a depth 6 blocks.

Depending on the next blocks that are received in the block tree, the blockchain can either continue along the blockchain with node A 301 or switch to the blockchains with either nodes B 302, node C 303 or node D 304.

As a result of the unknown direction of the blockchain at time t, it is difficult to predict whether a particular block may be considered confirmed.

Therefore, rapid growth of the block tree does not lead to faster confirmation of blocks.

However, alternatively, if blocks in a block tree are generated slower, then the resulting block tree may be a single path.

When the blocks are generated comparatively slower, every block that is generated in the system may be part of the blockchain.

However, the slow generation of blocks makes the blockchain growth slow.

Figure 4:
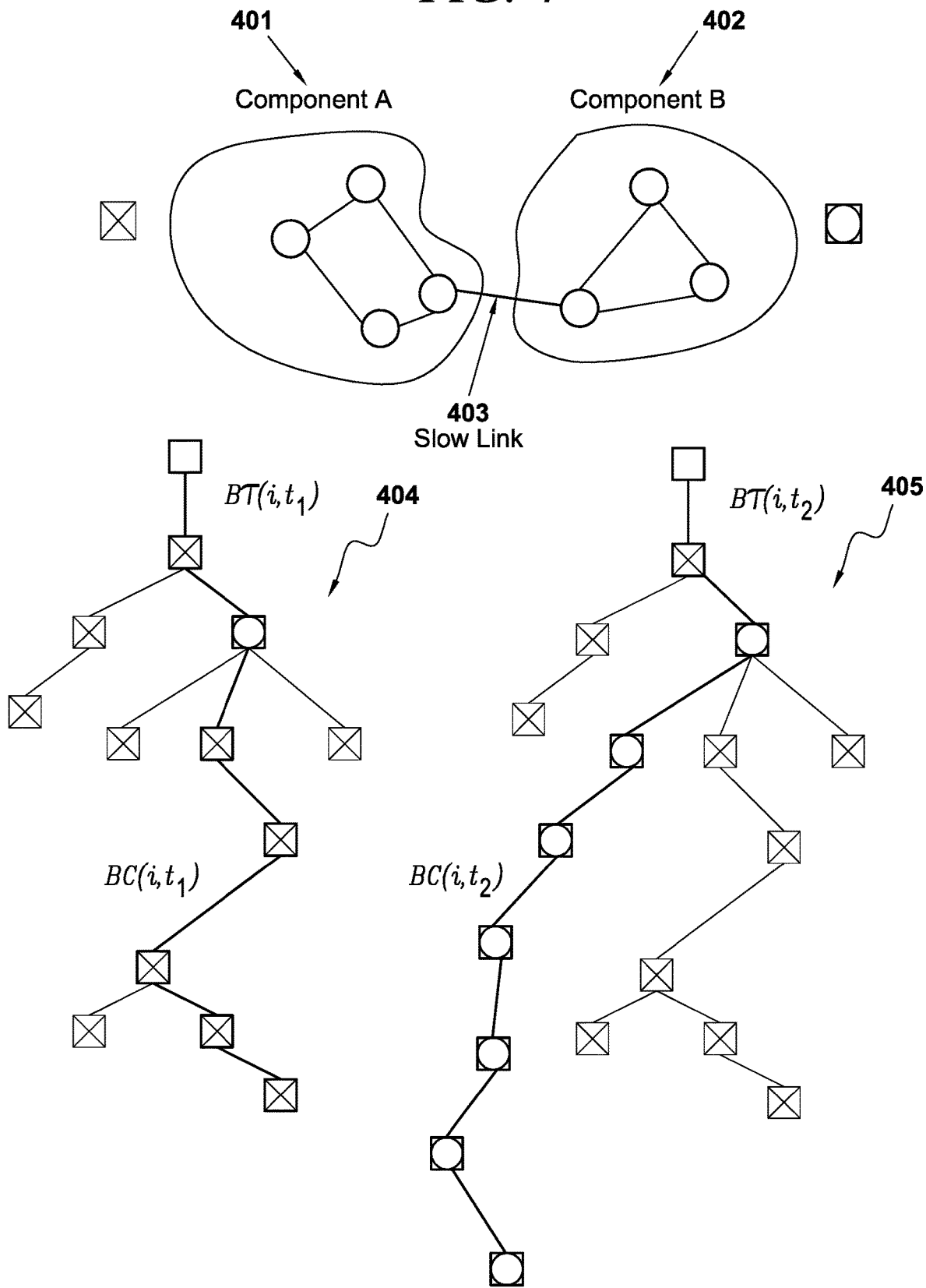
FIG. 4 illustrates an example of an abrupt change in the blockchain due to a large network delay.

FIG. 4 illustrates an abrupt change in blockchain due to large network delay.

Network delays are arbitrary and new blocks can be received at any point and time in the system and therefore, can change the blockchain.

For example, the network in FIG. 4, in which the nodes in the network are in two components, namely, component A 401 and component B 402 that are separated by an unpredictable link 403 with intermittent connectivity.

FIG. 4 illustrates a block tree 404 at node i in component A 401 at times $t_1$ and $t_2$.

The blocks with X marks are the blocks generated by nodes in component A 401 and the blocks with the O mark are the blocks generated in component B 402.

As the blocks from component B 402 are variably delayed, a group of blocks may arrive after an arbitrary delay and may change the blockchain at user i.

Therefore, in a network with an arbitrary delay, it may not be possible to provide a guarantee that a block definitively belongs in the block chain.

However, the current embodiments are directed towards networks that have bounded delay and in these networks, it may be determined that a block belongs in a blockchain.

Given the impossibility of determining, with certainty, whether a block belongs to a blockchain when network delays are unbounded, the current embodiments are directed towards all transmission delays in the network being upper bounded by $\Delta$.

By being upper bounded by $\Delta$, any message will reach the intended recipient within a time of $\Delta$ of the transmit time.

Upper bounding allows the system to definitively determine if a block belongs to the blockchain and further as the determination may be made faster, it is possible to speed up blockchains significantly, as compared to the case where network delays are unbounded.

The system in the current embodiment may comprise n users. User i may compute hashes at rate $h_i$.

$h = \Sigma_i h_i$ denotes the total hash rate of the system.

The hash may be a 256 bit binary string. The hash is successful if the hash is less than a target value t. Therefore, the probability that a particular hash is successful is $s = t2^{-256}$.

I denotes the time between successive blocks being introduced into the system.

From the independence of the hashes:

$$Pr[I>t] = (1-s)^{ht} \approx e^{-sht}.$$

The block generation process is (approximately) a Poisson process with rate $\lambda = sh$.

Figure 5:
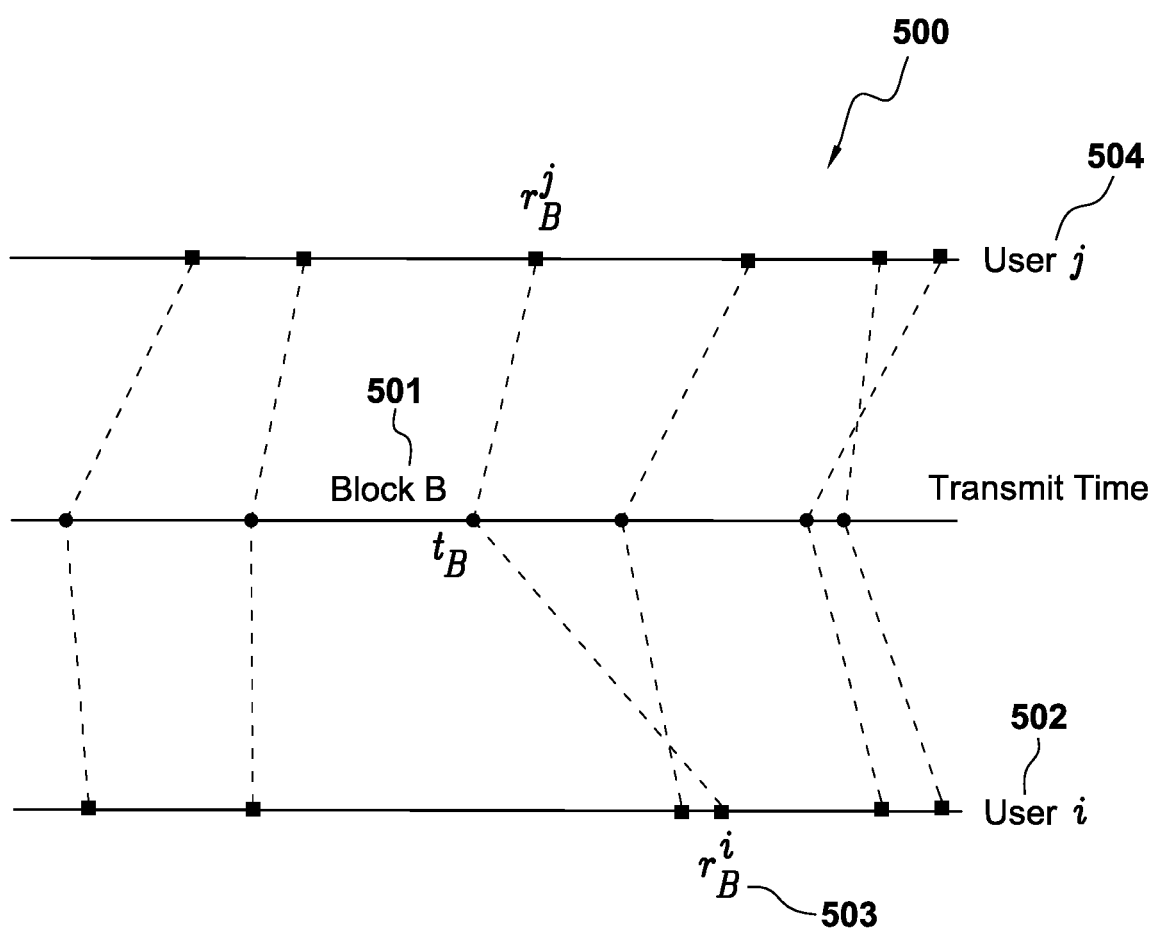
FIG. 5 illustrates an example of block generation and block arrival times in the blockchain.

FIG. 5 illustrates a diagram 500 of block generation and block arrival times.

The time between block introductions into the system is exponentially distributed with parameter $\lambda = sh$.

The mean time between blocks is $$\frac{1}{sh}.$$

For example, if a global clock and block B 501 is generated by a user at time $t_B$ in the global clock and that block B 501 reaches user i 502 at time $r_B^i$ 503.

FIG. 5 illustrates the block generation and block arrival times at users i 502 and user j 504. From the maximum delay assumption, $r_B^i - t_B \leq \Delta$, for all blocks B 501 for all users i 502.

BT(i, t) and BC(i, t) may be used to denote the block tree and block chain at user i 502 at time t.

For any $B \in BT(i, t)$, $d_B$ denotes the depth of block B 501.

The depth of block B 501 is indicated in block B 501 by the generating user.

$N_d(i, t)$ denotes the number of blocks at depth d observed by user i 502 at time t.

Singular blocks are blocks that are unique at a given height in the blockchain.

A block B 501 is singular at user i 502 at time t if $N_{d_B}(i,t) = 1$.

A block B 501 is permanently singular at user i 502 if $N_{d_B}(i, \infty) = 1$.

Every permanently singular block belongs to the blockchain at all users because every node in the blockchain has depth one more than its predecessor and as the blockchain starts at the root node with depth zero, since a permanently singular block is the only block at a given depth, any path from the tip of the blockchain to the root has to pass through a permanently singular node.

Figure 6:
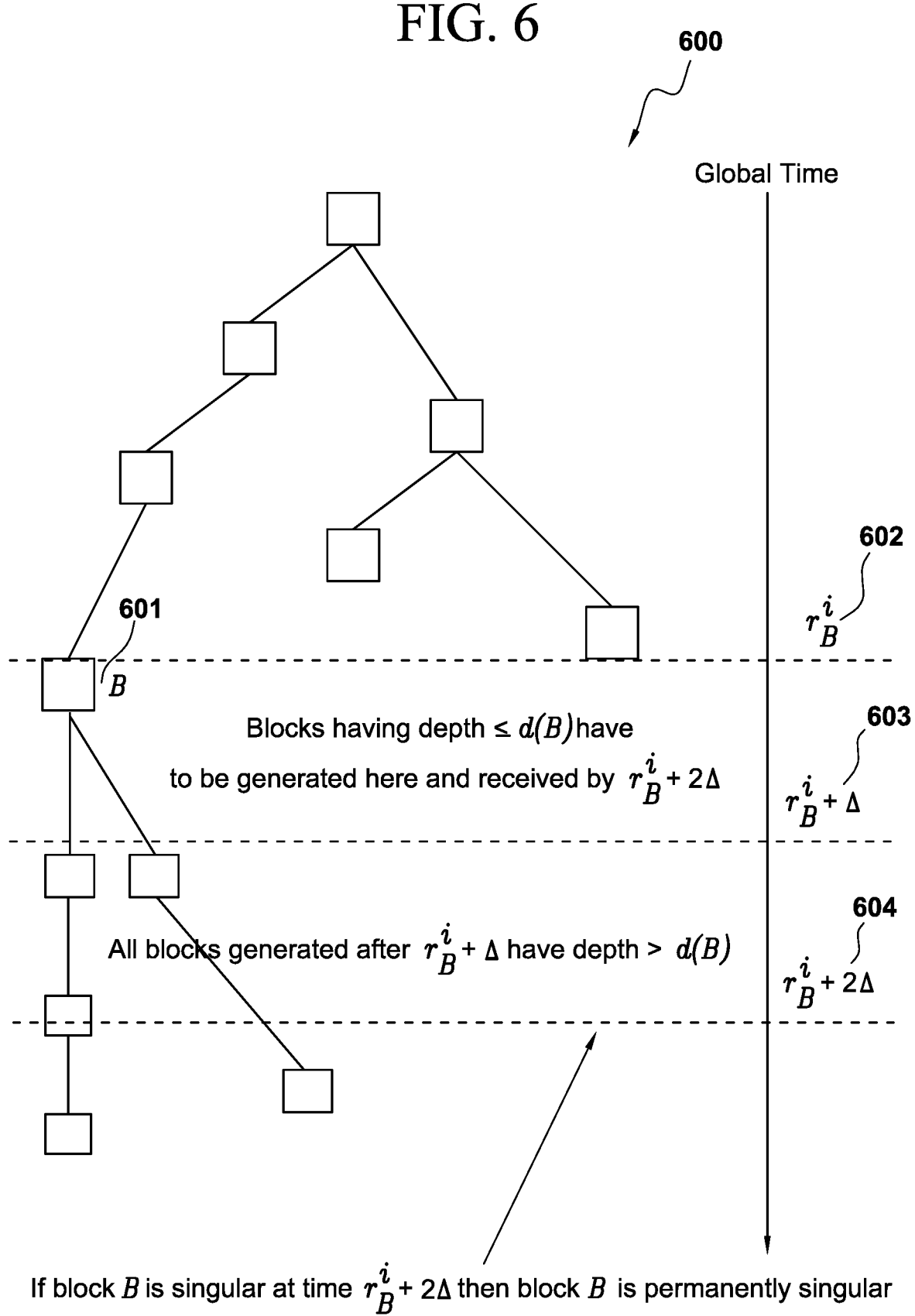
FIG. 6 illustrates an example of identifying singular blocks in a blockchain.

FIG. 6 illustrates a block tree 600 for identifying singular blocks in a blockchain.

When the arrival time of block B 601 at user i is $r_B^i$ 601 and it is singular at time $r_B^i + 2\Delta$ 604, then block B 601 is permanently singular, as:

$$N_{d_B}(i, r_B^i + 2\Delta) = 1 N_{d_B}(i, \infty) = 1.$$

Because the arrival time of block B 601 at user i is $r_B^i$ 601, by time $r_B^i + \Delta$ 603, block B 601 has reached all users.

Any block added after $r_B^i + \Delta$ 604 has a depth greater than block B 601.

Therefore, any block that is added between times $t_B$ and $t_B + \Delta$ are the only blocks that can potentially be at the same depth as block B 601.

These blocks will reach all users by time $r_B^i + 2\Delta$ 604. If a block is still singular at time $r_B^i + 2\Delta$ 604, then it will be singular permanently and therefore, in the block chain.

When Block B 601 is permanently singular at user i, then it will be permanently singular at all other users.

Block B is permanently singular because if a block B 601 is not permanently singular at some user i, then there is a block B' that is at the same depth as block B 601 at user i. Therefore, as Block B' will reach all users, block B 601 cannot be permanently singular at any user.

Therefore, by controlling the block generation rate such that there are a sufficient number of permanently singular blocks, identifying permanently singular blocks can be performed quickly and transactions can be confirmed rapidly.

Block B 601 is singular if no block is generated within a time of $\Delta$ before and after the generation time of the block B.

Block B 601 is a singular block if $t_B - t_{B-1} > \Delta$ and $t_{B+1} - t_B > \Delta$.

Block B 601 is a singular block because since there is a gap of $\Delta$ before the generation time of block B 601, all blocks up to and including block B−1 have reached all users before block B 601 is generated.

Therefore, the depth $d_B$ of block B 601 is one greater than the depth of any other block in the system.

Since no block is generated for time $\Delta$ after block B 601 is generated, block B 601 reaches all users.

Any block generated after this will have a depth one more than the depth of block B 601. Therefore, block B 601 is the only block at depth $d_B$ and therefore, it is a singular block.

Therefore, $t_B - t_{B-1} > \Delta$ and $t_{B+1} - t_B > \Delta$ may be used to control the block generation rate in order to generate permanently singular blocks at a sufficiently rapid rate.

The total hash rate of all the users in the system is h. Define $$Y_i = \begin{cases} 0 & \text{if Block } i \text{ is not singular} \\ 1 & \text{if Block } i \text{ is singular} \end{cases}.$$

N(t) denotes the number of blocks generated in the system by time t. The rate of singular blocks is then $$\lambda_s = \lim_{t \to \infty} \frac{\sum_{i=1}^{N(t)} Y_i}{t}.$$

This rate may be rewritten as $$\lambda_s = \lim_{t \to \infty} \frac{\sum_{i=1}^{N(t)} Y_i}{(N)t} \frac{N(t)}{t}.$$

The second term is the block generation rate $\lambda$ and the first term is the probability that that a block is singular. Stated another way, $$Pr[\text{Block is Singular}] = \frac{\sum_{i=1}^{N(t)} Y_i}{(N)t}.$$

A block is singular if the block is preceded and succeeded by an inter-block gap of $\Delta$. The probability for each of these events is $e^{-\lambda \Delta}$.

Therefore, $Pr[\text{Block is Singular}] \geq e^{-2\lambda \Delta}$.

Therefore, $\lambda_S \geq \lambda e^{-2\lambda \Delta}$.

Maximizing the regeneration block rate requires a system with a total hash rate of h, and a maximum network delay of $\Delta$. Therefore, the singular block rate is maximized if $$s = \frac{1}{2h\Delta}$$

and the maximum singular block rate is $$\lambda_S^* = \frac{1}{2e\Delta}.$$

The singular block rate is lower bounded by $\lambda e^{-2\lambda \Delta}$ and by differentiating the expression with respect to s and setting to zero:

$$\frac{d\lambda_S}{ds} = he^{-2sh\Delta} - 2sh^2 \Delta e^{-2sh\Delta} = 0$$

and by solving for s:

$$s = \frac{1}{2h\Delta}$$

and the corresponding optimal value of $$\lambda_S^* = \frac{1}{2e\Delta}.$$

Because users may enter and leave the blockchain dynamically, the total hash rate of the network can vary across time.

In order to ensure that sufficient singular blocks are generated, the success probability may be adjusted to ensure that the block generation rate is roughly $$\frac{1}{2\Delta}.$$

The adjustment may be performed periodically once every C singular blocks.

Each user may maintain a count of the number of singular blocks since the last successful probability adjustment.

When the count reaches C, the user estimates the block generation rate over the last adjustment interval.

Each block is then time-stamped by the user that generates the block.

$T_i$ denotes the time stamp at the last rate adjustment singular block, and $T_f$ denotes the time stamp of the singular block that makes the count reach C.

The number of blocks (not necessarily singular) received during this interval be is N.

Therefore, the network block generation rate is approximately $$\lambda_e = \frac{N}{T_f - T_i}.$$

The approximate rate may be slightly different at different users due to network delays.

If C is chosen appropriately, then this difference will be small.

The user computes the success probability as $$s = \frac{1}{2\lambda_e \Delta}.$$

The system then waits for a time period, Δ before implementing the new success probability, in order to account for the fact that there may be delay of up to Δ for other users to receive the singular block C and to perform re-computations.

When the new success probability is implemented, all users may start using the new success probability.

The counter for the number of singular blocks before adjustment is performed again and is reset to zero and when this counter reaches C, the process is repeated.

Figure 7:
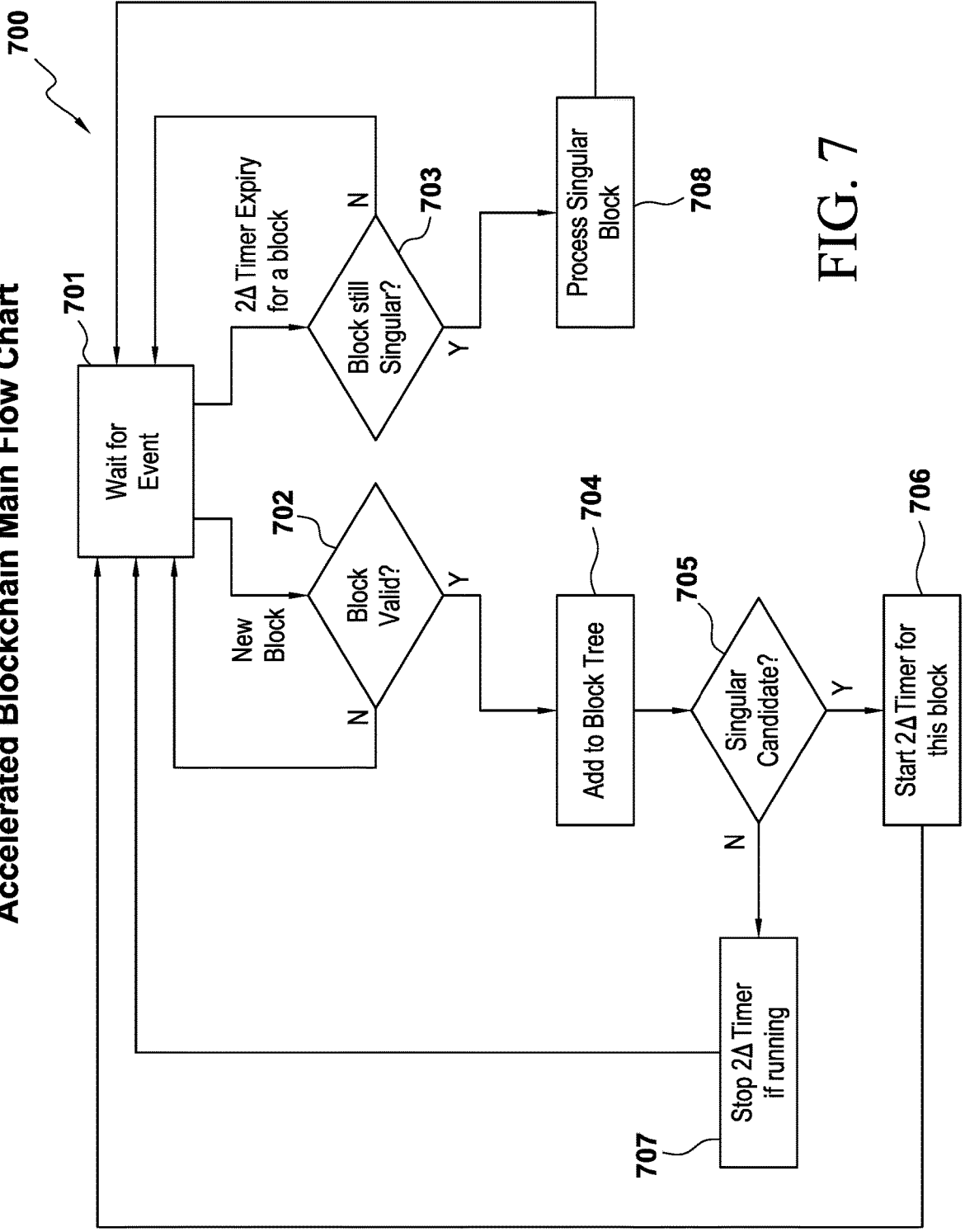
FIG. 7 illustrates a flowchart for accelerated blockchain of the present embodiment.

FIG. 7 illustrates a flow chart for a method 700 for an accelerated blockchain.

The method 700 begins at step 701 by waiting for an event 701. Waiting for an event 701 may include waiting for a block reception event or waiting for a timer expiry event.

The method 700 proceeds to step 702 when there is a block reception event, specifically, receiving a new block to the blockchain. Step 702 includes determining whether the block is valid. This determination is made by checking the syntactic correctness (checksum) and semantic correctness including whether there is a valid hash corresponding to the current difficulty level, that inputs of all transactions and referenced in the predecessor blocks of the new block, that ancestor blocks of the new block are included in the last singular block and that the new block received is within 2 Δ of any earlier block at the same height. If yes, the method 700 proceeds to step 704. If no, the method 700 proceeds back to step 701 to wait for an event.

Step 704 adds the block to the block tree. Adding the new block to the block tree includes inserting the new block in the appropriate position in the block tree corresponding to its height and predecessors.

The method 700 then proceeds to step 705 to determine if the block is a singular candidate. Determining whether the block is a singular candidate requires determining whether the new block is the only block at the given height and is a descendent of the last singular block. If yes, the method 700 proceeds to step 706. If no, the method 700 proceeds to step 707.

Step 706 starts a 2Δ timer for the block and proceeds back to step 701.

Step 707 stops a 2Δ timer (if running) and proceeds back to step 701.

The method 700 then proceeds from step 706 to step 701 to step 703, when the 2Δ timer expires. After the timer expires, the method 700 proceeds to step 703 to determine whether the block is still singular. Determining whether the block is still singular is a sanity check to determine whether the expiration of the timer corresponds to a singular block (i.e., a unique block at a given depth) and that all ancestor blocks are present in the block tree. If yes, the method 700 proceeds to step 708 to process the singular block. If no, the method 700 proceeds to step 701.

Step 708 processes the singular block. The processing of the singular block requires marking the block as singular, marking all blocks between this block and the previous singular block as belonging to the blockchain, removing all transactions in this set of blocks from the mempool (which is the set of unconfirmed transactions) and are marked as confirmed and setting the blockchain tip as the descendent of this block with the most work.

Figure 8:
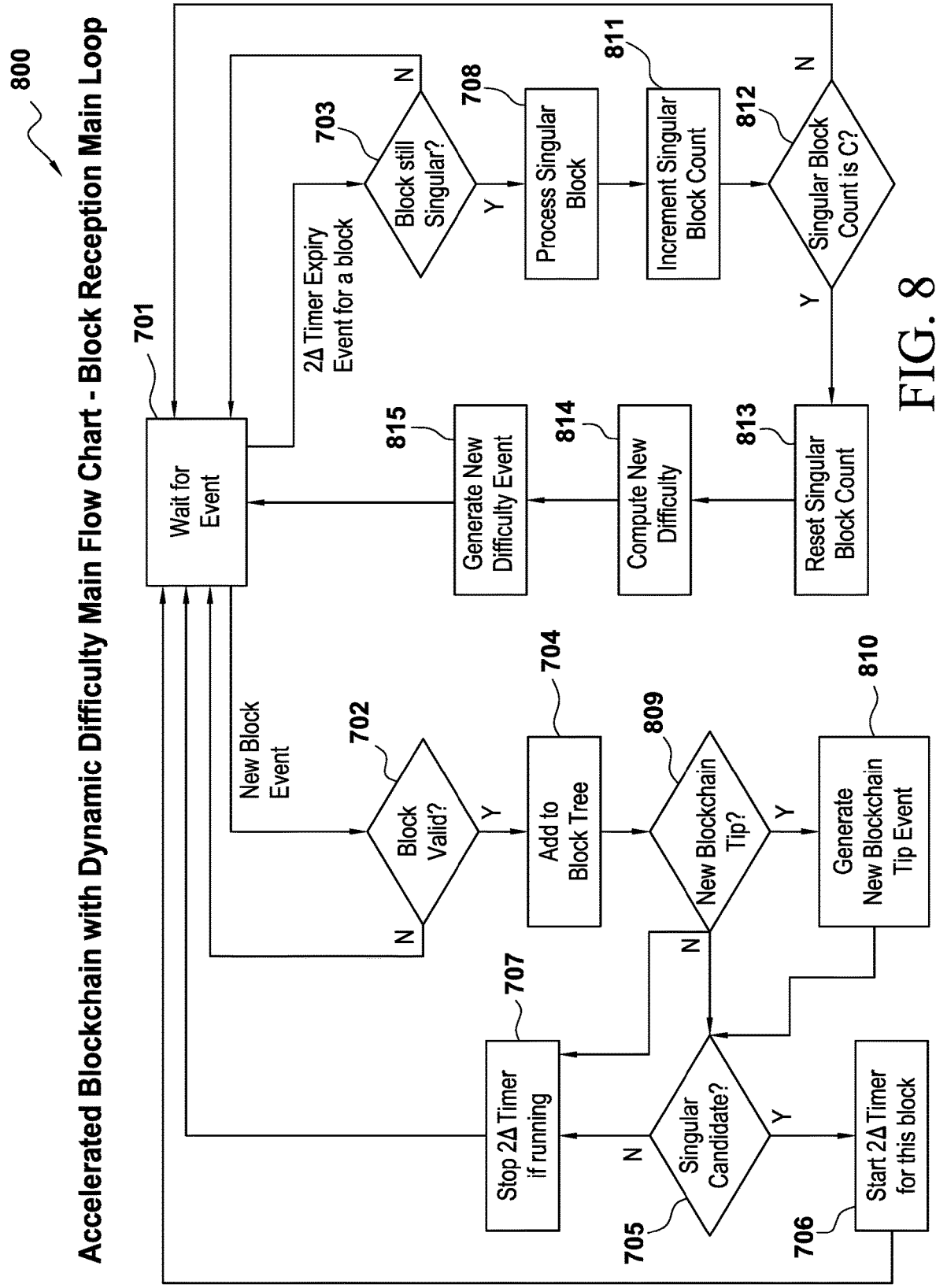
FIG. 8 illustrates a flowchart for accelerated blockchain with dynamic difficulty for block reception of the present embodiment.

FIG. 8 illustrates a flowchart for a method for 800 for accelerated blockchain with dynamic difficulty for block reception.

Similar reference numerals to FIG. 7 are repeated for FIG. 8 and descriptions for those steps are incorporated herein.

FIG. 8 illustrates a method for retaining the target block spacing as the number of miners change and to providing resistance to hashing attacks.

The accelerated blockchain method of FIG. 8 may be configured with target block spacing, retarget multiple and difficulty static parameters at startup Target block spacing is the ideal spacing (in time units) between successive blocks in the blockchain Retarget multiple is the number C of singular blocks to wait before changing the current difficulty level (i.e. a period).

Difficulty level is the amount of hash computations needed for a valid block. Higher difficulty levels correspond to more hash computations.

The method 800 uses the existing blockchain difficulty adjustment mechanisms, but uses singular blocks instead of regular blocks.

Therefore, for every N singular blocks (one period):

New difficulty=Previous difficulty*(Expected Time)/(Observed Time).

Observed Time=Time between the Nth singular block of this period and the Nth singular block of previous period.

Expected Time=Target Spacing*(height difference between the Nth singular block of this period and the Nth singular block of previous period).

To prevent excessive swings, new difficulty may be clamped to between ¼* previous difficulty and 4* previous difficulty.

The method 800 proceeds from step 704 to step 809. Step 809 determines whether the new block is a new blockchain tip. If yes, the method 800 proceeds to step 810 which generates a new blockchain tip event. If no, the method 800 may proceed to step 705 or alternatively directly to step 707.

The method 800 proceeds from step 707 to step 811 which increments singular block count. The method 800 then proceeds to step 812 which determines whether the singular block count is C. If yes, the method 800 proceeds to step 813. If no, the method 800 proceeds back to step 701.

The method 800 then proceeds to step 813 which resets the singular block count.

The method 800 then proceeds to step 814 which computes a new difficulty.

The method 800 then proceeds to step 815 which generates a new difficulty new event.

The method 800 then proceeds back to step 701.

Figure 9:
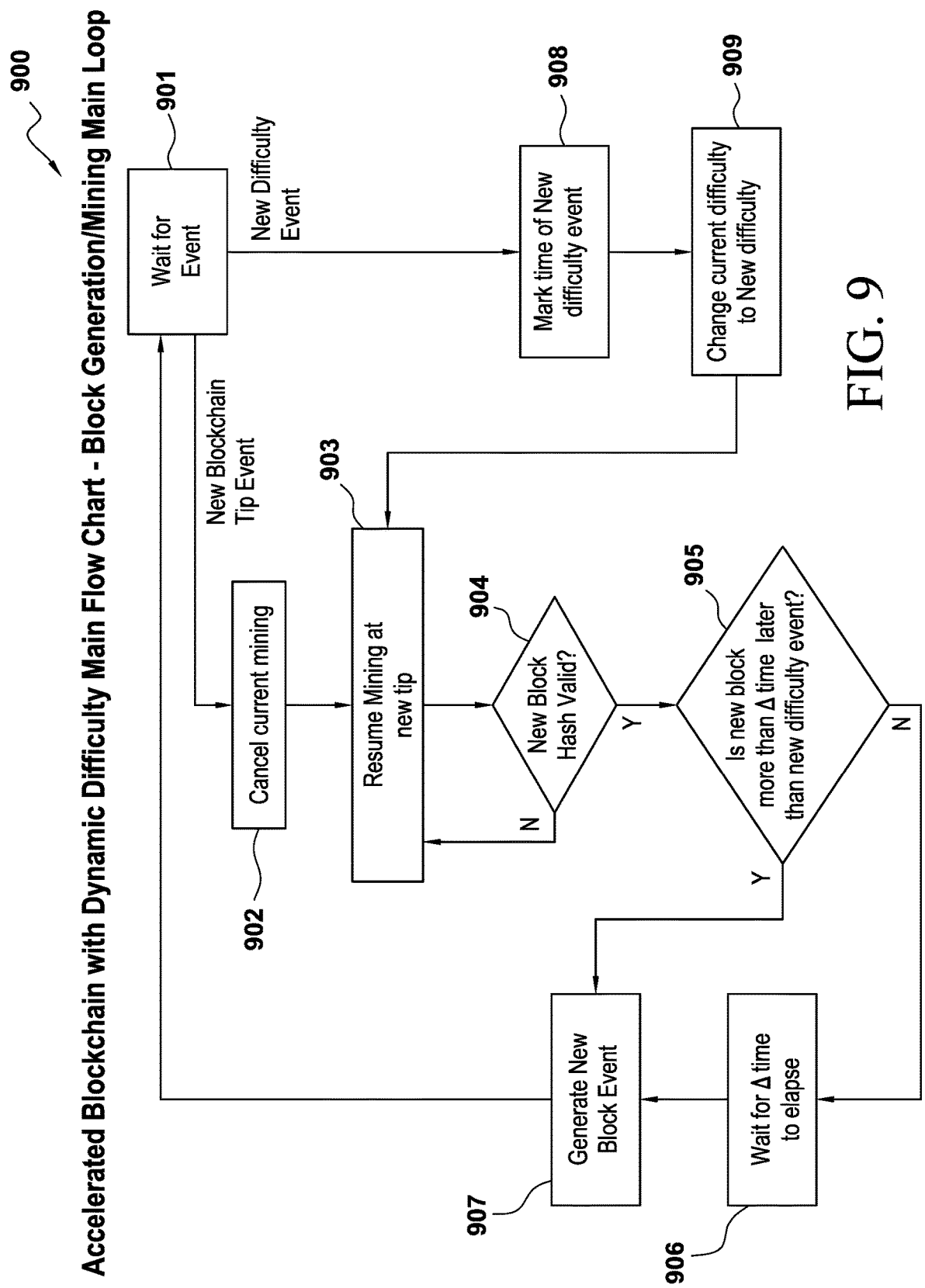
FIG. 9 illustrates a flowchart for accelerated blockchain with dynamic difficulty for mining of the present embodiment.

FIG. 9 illustrates flowchart for a method 900 for accelerated blockchain with dynamic difficulty for mining.

The method 900 starts at step 901 by waiting for an event. The event may either be a new difficulty event or a new blockchain tip event.

The method 900 proceeds to step 902 when a new blockchain tip event is detected. Step 902 cancels the current mining.

The method 900 then proceeds to step 903 which resumes mining at the new blockchain tip.

The method 900 then proceeds to step 904 which determines whether the new block hash is valid. If yes, the method 900 proceeds to step 905. If no, the method proceeds back to step 903.

The method 900 proceeds to step 905 which determines whether the new block is more than ☐ time later than the new difficulty event. If yes, the method 900 proceeds to step 907. If no, the method 900 proceeds to step 906.

Because singular block detection is performed with a spread of ☐ time units across the nodes, different nodes start mining with the new difficulty at different times. If new difficulty is more, a node could reject incoming blocks with lower difficulty and if the new difficulty is less, other nodes could reject blocks mined by this node. Therefore, step 905 determines whether the new block is more than ☐ times later than the new difficulty event, specifically, whenever a new round is to be initiated, the method 900 ensures that the first new block of the new round is sent out at least a time ☐ later than the end of the previous round.

The method 900 proceeds to step 907 which generates a new block event and then proceeds back to step 901.

The method 900 proceeds to step 906 which waits for ☐ time to elapse. Once the time has elapsed, the method 900 proceeds to step 907 which generates a new block event and then proceeds back to step 901.

The method 900 proceeds to step 908 when a new difficulty event is detected. Step 908 marks the time of the new difficulty event.

The method 900 then proceeds to step 909 which changes current difficulty to the new difficulty.

The method 900 then proceeds to step 903 which resumes mining at the new tip.

A malicious node with sufficient hash power may generate duplicate blocks at each height which could result in preventing the occurrence of singular blocks entirely, halt block and transaction confirmation or freeze the difficulty at the current level.

Therefore, to prevent this, the system may issue an alarm if a period is taking too much time, or if a node is generating too many duplicate blocks or this may be resolve at the human level.

For example, the system may include a default timeout that is triggered if a period is taking too much time. The timeout may be used to change the difficulty level in all nodes atomically.

Eventually, the difficulty level will increase beyond the level of the malicious node (if it controls less than 50% of the hash power).

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for accelerating blockchains in a network with nodes, the method comprising:
   receiving a block;
   determining whether the block is valid by checking whether there is a valid hash corresponding to a current difficulty level;
   adding the block to a block tree;
   determining whether the block is a singular candidate;
   starting a timer for the block;
   determining whether the timer has expired for the block;
   determining whether the block is still singular after the time has expired for the block, wherein a permanently singular block is the only block at a given depth; and
   processing the singular block.

2. The method for accelerating blockchains of claim 1, the method further comprising:
returning to a waiting state when the block is invalid, wherein the network exits the waiting state when a block reception event or a timer expiry event occurs.

3. The method for accelerating blockchains of claim 1, the method further comprising:
stopping the timer when the block is not the singular candidate and returning to a waiting state, wherein the network exits the waiting state when a block reception event or a timer expiry event occurs.

4. The method for accelerating blockchains of claim 1, the method further comprising:
returning to a waiting state after the timer has expired when the block is not the singular candidate, wherein the network exits the waiting state when a block reception event or a timer expiry event occurs.

5. The method for accelerating blockchains of claim 1, the method further comprising:
returning to a waiting state after processing the singular block, wherein the network exits the waiting state when a block reception event or a timer expiry event occurs.

6. The method for accelerating blockchains of claim 1, the method further comprising:
determining whether the block is a new blockchain tip.

7. The method for accelerating blockchains of claim 6, the method further comprising:
generating a new blockchain tip event when the block is the new blockchain tip.

8. The method for accelerating blockchains of claim 7, the method further comprising:
canceling current mining after the new blockchain tip event is generated.

9. The method for accelerating blockchains of claim 8, the method further comprising:
resuming mining at the new blockchain tip after canceling the current mining.

10. The method for accelerating blockchains of claim 9, the method further comprising:
determining whether a hash of a new block is valid after resuming mining at the new blockchain tip.

11. The method for accelerating blockchains of claim 10, the method further comprising:
resuming mining when the hash of the new block is invalid.

12. The method for accelerating blockchains of claim 8, the method further comprising:
waiting for the second time to expire when the block is sent out less than a second time later than the first time of the new difficulty event.

13. The method for accelerating blockchains of claim 6, the method further comprising:
determining whether the new block is the singular candidate when the block is not the new blockchain tip.

14. The method for accelerating blockchains of claim 1, the method further comprising:
incrementing a singular block count after processing the singular block.

15. The method for accelerating blockchains of claim 14, the method further comprising: determining whether the singular block count is C after incrementing the singular block count.

16. The method for accelerating blockchains of claim 14, the method further comprising:
returning to a waiting state when the singular block count is not C, wherein the network exits the waiting state when a block reception event or a timer expiry event occurs.

17. The method for accelerating blockchains of claim 16, the method further comprising:
resetting the singular block count when the singular block count is C.

18. The method for accelerating blockchains of claim 17, the method further comprising:
computing a new difficulty level after resetting the singular block count.

19. The method for accelerating blockchains of claim 18, the method further comprising:
generating a new difficulty event after computing the new difficulty level.

20. The method for accelerating blockchains of claim 19, the method further comprising:
returning to a waiting state after generating the new difficulty event, wherein the network exits the waiting state when a block reception event or a timer expiry event occurs.

21. The method for accelerating blockchains of claim 19, the method further comprising:
marking a first time of the new difficulty event.

22. The method for accelerating blockchains of claim 21, the method further comprising:
changing to the new difficulty level after marking the first time of the new difficulty event.

23. The method for accelerating blockchains of claim 22, the method further comprising:
resuming mining at the new blockchain tip after changing to the new difficulty level.

24. The method for accelerating blockchains of claim 21, the method further comprising:
determining whether the new block is sent out more than a second time later than the first time of the new difficulty event.

25. The method for accelerating blockchains of claim 24, the method further comprising:
generating a new block event when the new block is sent out more than the second time later than the first time of the new difficulty event.

* * * * *